(12) United States Patent
Kress et al.

(10) Patent No.: US 9,480,937 B2
(45) Date of Patent: Nov. 1, 2016

(54) HYDRAULIC FILTER

(75) Inventors: Achim Kress, Kupferzell (DE); Albert Schick, Brackenheim (DE)

(73) Assignee: Mahle International GmbH (DE)

( * ) Notice: Subject to any disclaimer, the term of this patent is extended or adjusted under 35 U.S.C. 154(b) by 604 days.

(21) Appl. No.: 13/988,215

(22) PCT Filed: Oct. 31, 2011

(86) PCT No.: PCT/EP2011/069077
§ 371 (c)(1),
(2), (4) Date: Jul. 29, 2013

(87) PCT Pub. No.: WO2012/065836
PCT Pub. Date: May 24, 2012

(65) Prior Publication Data
US 2013/0299414 A1    Nov. 14, 2013

(30) Foreign Application Priority Data
Nov. 19, 2010  (DE) .................. 10 2010 044 169

(51) Int. Cl.
*B01D 29/58* (2006.01)
*B01D 29/11* (2006.01)
*B01D 35/147* (2006.01)

(52) U.S. Cl.
CPC ............. *B01D 29/58* (2013.01); *B01D 29/114* (2013.01); *B01D 35/147* (2013.01); *B01D 2201/46* (2013.01)

(58) Field of Classification Search
None
See application file for complete search history.

(56) References Cited

U.S. PATENT DOCUMENTS

| 2,253,686 | A |   | 8/1941  | Burckhalter |           |
|-----------|---|---|---------|-------------|-----------|
| 2,929,506 | A |   | 3/1960  | Belgarde    |           |
| 3,388,802 | A |   | 6/1968  | Wilkinson   |           |
| 5,068,877 | A |   | 11/1991 | Near et al. |           |
| 5,160,037 | A | * | 11/1992 | LeCour ................ | B01D 35/143 |
|           |   |   |         |             | 210/132   |
| 6,478,958 | B1|   | 11/2002 | Beard et al.|           |
| 7,704,396 | B2|   | 4/2010  | Meddock et al. |        |
| 8,425,769 | B2| * | 4/2013  | Gift ..................... | B01D 27/103 |
|           |   |   |         |             | 210/130   |

FOREIGN PATENT DOCUMENTS

| DE | 1181570 B      | 11/1964 |
| DE | 60026447 T2    | 11/2006 |
| DE | 202008004371 U1 | 8/2009 |
| DE | 202007019097 U1 | 9/2010 |
| EP | 1870148 A1     | 12/2007 |

\* cited by examiner

*Primary Examiner* — Terry Cecil
(74) *Attorney, Agent, or Firm* — Fishman Stewart PLLC

(57) ABSTRACT

A hydraulic filter may include a ring-shaped full-flow filter and a partial-flow filter arranged coaxially inside the full-flow filter.

20 Claims, 1 Drawing Sheet

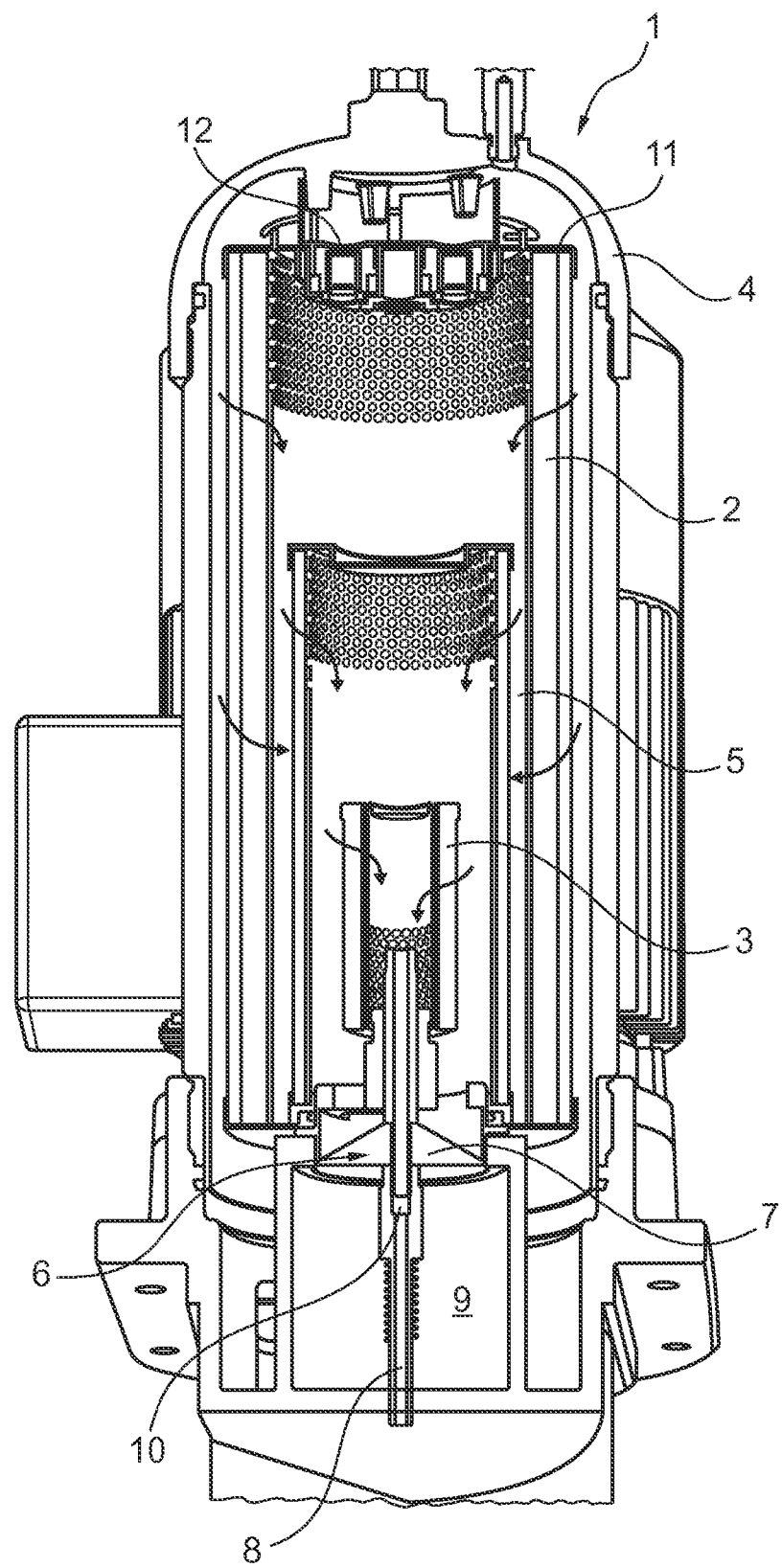

US 9,480,937 B2

HYDRAULIC FILTER

CROSS-REFERENCE TO RELATED APPLICATIONS

This application claims priority to German Patent Application 10 2010 044 169.4 filed Nov. 19, 2010, and International Patent Application PCT/EP2011/069077 filed on Oct. 31, 2011, both of which are hereby incorporated by reference in their entirety.

TECHNICAL FIELD

The present invention relates to a hydraulic filter.

BACKGROUND

Hydraulic filters for filtering for example hydraulic oil often have a full-flow filter and a partial-flow, the full-flow filter having the task of filtering the hydraulic liquid during normal operation, whereas the partial-flow filter assumes a permanent oil maintenance function. Previously, the partial-flow filter was usually arranged in a separate filter housing and supplied with a completely separate partial flow or a small partial flow branched off from the full flow. Consequently, two housings were needed for operation, which resulted in not inconsiderable costs.

SUMMARY

The present invention is concerned with the problem of specifying an improved embodiment for an oil filter, in particular for a hydraulic filter, which can in particular be produced more cost-effectively.

This problem is solved according to the invention by the subject matter of independent claim(s). Advantageous embodiments form the subject matter of the dependent claims.

The present invention is based on the general concept, in a hydraulic filter having a ring-shaped full-flow filter and a likewise ring-shaped partial-flow filter, of arranged the partial-flow filter coaxially inside the ring-shaped full-flow filter and thus in an optimal manner in terms of installation space, as a result of which a separate filter housing for the partial-flow filter can be omitted entirely. The full-flow filter has a ring filter element through which flow can pass from the outside inwards in a known manner. The partial-flow filter, which is for example ring-shaped, is arranged in the interior, that is, on a clean side of the full-flow filter, a small but permanent outflow of hydraulic liquid back to a hydraulic reservoir taking place via the partial-flow filter. A clean duct of the partial-flow filter can for example be connected to a tank or the hydraulic reservoir, so the hydraulic liquid filtered in the hydraulic filter is conducted entirely through the full-flow filter and then mostly to a hydraulic consumer, whereas a small part of the hydraulic liquid which has already been pre-filtered by the full-flow filter is conducted back to the tank or hydraulic reservoir via the partial-flow filter. In addition, a bypass valve can be provided, which opens when the full-flow filter is blocked so that the hydraulic flow bypasses the full-flow filter.

With such an arrangement of the partial-flow filter, permanent purification of the hydraulic liquid can be achieved even when the hydraulic consumers are at rest. The arrangement according to the invention of the partial-flow filter inside the full-flow filter allows the entire hydraulic filter to be designed not only in an optimal manner in terms of installation space, but also in a much more cost-effective manner, as a separate filter housing for the partial-flow filter can be omitted entirely, so only one filter housing is necessary.

In an advantageous development of the solution according to the invention, a safety filter is arranged between the full-flow filter and the partial-flow filter. The term "safety filter" should also include nets, mesh-like fabrics and non-woven fabrics, the safety filter usually not having the same filter function as the full-flow and partial-flow filters, but merely providing the function of what is known as a "screw catcher", which is used to retain coarse dirt or foreign objects, which can result in damage to the downstream partial-flow filter under certain circumstances, or of filtration during cold starting. The safety filter is formed in a similar manner, that is, likewise preferably ring-shaped. The safety filter is used in particular during cold starting and when the full-flow filter is blocked and the bypass valve opens, so that the hydraulic flow bypasses the full-flow filter. In this case, the safety filter is also used as a pre-filter for the partial-flow filter.

In an advantageous development of the solution according to the invention, the full-flow filter, the partial-flow filter and/or the safety filter can be replaced individually, in pairs or all together. This makes it possible to replace the individual filters flexibly, at the same time ensuring comparatively easy installation, as a result of which maintenance costs in particular can be kept low.

Further important features and advantages of the invention can be found in the subclaims, the drawing and the associated description of the figure using the drawing.

It is self-evident that the above-mentioned features and those still to be explained below can be used not only in the combination given in each case but also in other combinations or alone without departing from the scope of the present invention.

BRIEF DESCRIPTION OF THE DRAWINGS

A preferred exemplary embodiment of the invention is shown in the drawing and is explained in the description below.

The single FIG. 1 shows a sectional diagram through a hydraulic filter according to the invention.

DETAILED DESCRIPTION

According to FIG. 1, a hydraulic filter 1 according to the invention has a ring-shaped full-flow filter 2 and a partial-flow filter 3 arranged coaxially inside thereto. The hydraulic filter 1 is usually used in hydraulic systems, in particular in motor vehicles, but the term "hydraulic filter" should also include other filters such as oil filters. The coaxial arrangement of the full-flow filter 2 and the partial-flow filter 3 produces an arrangement which is optimal in terms of installation space and also makes a separate filter housing for the partial-flow filter 3, as was previously necessary, superfluous. The hydraulic filter 1 according to the invention consequently has a single filter housing 4 which contains all the full-flow and partial-flow filters 2, 3, the filter housing 4 also being designed for high pressures. A safety filter 5 is arranged between the full-flow filter 2 and the partial-flow filter 3, which safety filter does not have a direct filtration function, but rather a retaining function for coarse dirt particles (chips), for which reason the safety filter 5 is commonly referred to as a "screw catcher" or cold-start filter. A bypass valve 12 is arranged in the region of an upper end disc 11 of the full-flow filter 2, which bypass filter opens when the full-flow filter 2 is blocked and conducts the hydraulic flow to be filtered around the full-flow filter 2. The safety filter 5 has an important function particularly in this case, as it then acts as a pre-filter for the partial-flow filter 3 and in particular retains coarse impurities, which are caught by the full-flow filter 2 when the bypass valve 12 is closed, as a result of which the partial-flow filter can be kept functional for longer.

It can be seen in FIG. 1 that the full-flow filter 2 can be switched by means of a valve 6, the valve 6 having a cone-like valve disc 7 in the diagram according to FIG. 1 and for this reason is also referred to as a cone valve. Guided centrally through the valve 6 is a clean duct 8 of the partial-flow filter 3, which is usually connected to a hydraulic reservoir or hydraulic tank in a communicating manner, so that the hydraulic liquid exiting the partial-flow filter 3 through the clean duct 8 is fed back to the hydraulic reservoir or hydraulic tank. The valve 6 is formed as an overpressure/check valve and directed towards a clean space 9, the valve 6 only opening when a predefined limit pressure is exceeded. Of course, the valve 6 is merely optional and can also be replaced by a duct.

The full-flow filter 2 can for example have a fineness of approx. 10 μm, whereas the safety filter 5 can have a fineness of approx. 50 μm and the partial-flow filter 3 can have a fineness of approx. 3 μm. The safety filter 5 can be formed for example as a wire mesh or a fine net. A throttle 10 can also be arranged in the region of the clean duct 8, which throttle throttles or limits an outflow of cleaned hydraulic liquid in the hydraulic tank.

In the hydraulic filter 1 according to the invention, it is provided for the full-flow filter 2, the partial-flow filter 3 and/or the safety filter 5 to be replaceable in pairs, all together or individually, that is, separately from each other, as a result of which the maintenance of the hydraulic filter 1 according to the invention can be simplified. The hydraulic filter 1 according to the invention also allows at least two-stage filtration to be achieved, namely a first stage through the full-flow filter 2, a third stage through the partial-flow filter 3, and a second stage through the safety filter 5 when the bypass valve is open. When the bypass valve is closed, the partial flow passes through the full-flow filter 2 first, then the safety filter 5 and finally the partial-flow filter 3, as a result of which the partial flow undergoes three-stage filtration.

The hydraulic filter 1 according to the invention generally functions as follows:

Hydraulic liquid to be filtered is first fed from a hydraulic tank to the hydraulic filter 1. The hydraulic liquid flows through the full-flow filter 2 and can then be supplied to a hydraulic consumer, for example a piston/cylinder assembly. However, not all the hydraulic flow to be filtered by the hydraulic filter 1 is generally supplied to the hydraulic consumer, but some of it, approx. 2 to 10%, is permanently fed back in a circuit-like manner to the hydraulic reservoir via the partial-flow filter 3. If the full-flow filter 2 is blocked, the bypass valve 12 opens, whereupon the hydraulic flow to be filtered bypasses the full-flow filter 2. In this case, the unfiltered hydraulic flow first meets the safety filter 5 in the interior of the full-flow filter 2 and, via the said safety filter, the partial-flow filter 3. After it has flowed through the partial-flow filter 3, the now filtered hydraulic partial flow is fed back to the hydraulic reservoir. The full flow is in this case fed to the clean space 9 via the valve 6.

With the hydraulic filter 1 according to the invention, its maintenance can be achieved by simplified replacement of individual or collected filters 2, 3 and 5, as well as a particularly compact construction, which is of particular advantage in modern engine compartments or confined conditions.

The invention claimed is:

1. A hydraulic filter, comprising: a ring-shaped full-flow filter having a longitudinal axis, a partial-flow filter arranged coaxially inside the full-flow filter and a safety filter arranged radially between the full-flow filter and the partial-flow filter with respect to the longitudinal axis; and a bypass valve arranged at an upper end disc of the full-flow filter;

wherein the bypass valve is adjustable between a closed position and an open position, and wherein a fluid flow of a fluid to be filtered flows through the full-flow filter, the safety filter and the partial-flow filter when the bypass valve is in the closed position, and the fluid flow of the fluid to be filtered flows through the safety filter and the partial-flow filter when the bypass valve is in the open position.

2. The hydraulic filter according to claim 1, wherein the partial-flow filter defines a clean duct guided centrally through a valve of the full-flow filter.

3. The hydraulic filter according to claim 2, further comprising a throttle arranged on the clean duct.

4. The hydraulic filter according to claim 2, wherein the clean duct fluidly connects a clean side of the partial-flow filter to a hydraulic reservoir and the valve fluidly connects a clean side of the full-flow filter to a clean space for supplying a consumer, wherein the clean space is fluidly separated from the hydraulic reservoir.

5. The hydraulic filter according to claim 4, wherein the partial-flow filter supplies approximately 2-10% of the fluid flow supplied to the hydraulic filter to the hydraulic reservoir.

6. The hydraulic filter according to claim 4, further comprising a throttle arranged on the clean duct.

7. The hydraulic filter according to claim 4, wherein the clean duct of the partial-flow filter and the valve of the full-flow filter are arranged in axial alignment with the longitudinal axis of the full-flow filter.

8. The hydraulic filter according to claim 1, wherein the partial-flow filter supplies approximately 2-10% of the fluid flow supplied to the hydraulic filter to a hydraulic reservoir.

9. The hydraulic filter according to claim 1, wherein the safety filter is arranged coaxially between the full-flow filter and the partial-flow filter.

10. The hydraulic filter according to claim 9, wherein the full-flow filter has a mesh size of approximately 10 μm, wherein the safety filter has a mesh size of approximately 50 μm and wherein the partial-flow filter has a mesh size of approximately 3 μm.

11. The hydraulic filter according to claim 10, wherein at least one of the full-flow filter, the partial-flow filter and the safety filter are selectively removable.

12. The hydraulic filter according to claim 9, wherein at least one of the full-flow filter, the partial-flow filter and the safety filter are selectively removable.

13. The hydraulic filter according to claim 1, wherein the fluid flow passes through the partial-flow filter permanently.

14. The hydraulic filter according to claim 1, further comprising a housing enclosing a cavity, wherein the safety filter and the partial-flow filter are arranged in axial alignment with the longitudinal axis of the full-flow filter in the cavity of the housing.

15. A hydraulic filter, comprising:
a housing enclosing a cavity, the housing configured to receive a fluid to be filtered into the cavity;
an annular first stage filter having a longitudinal axis disposed in the cavity of the housing, the first stage filter including a first end disc and a second end disc disposed axially opposite the first end disc with respect to the longitudinal axis;
an annular third stage filter arranged coaxially and radially inside the first stage filter;
an annular second stage filter arranged coaxially and radially between the first stage filter and the third stage filter, wherein the second stage filter and the third stage filter are disposed in axial alignment with the longitudinal axis of the first stage filter;
a bypass valve arranged at the first end disc of the first stage filter;
a discharge valve arranged at the second end disc of the first stage filter, the discharge valve being in fluid communication with a clean side of the first stage filter and a clean space of the housing, the clean space fluidly separated from the cavity of the housing;
a clean duct guided centrally through the discharge valve, the clean duct in fluid communication with a clean side of the third stage filter and a hydraulic reservoir, wherein the hydraulic reservoir is fluidly separated from the clean space of the housing;
wherein the bypass valve is adjustable between a closed position and an open position, and wherein a fluid flow of the fluid to be filtered passes through the first stage filter, the second stage filter and the third stage filter when the bypass valve is in the closed position, and the fluid flow of fluid to be filtered passes through the second stage filter and the third stage filter when the bypass valve is in the open position.

16. The hydraulic filter according to claim 15, wherein the housing receives the fluid to be filtered from the hydraulic reservoir, and wherein the fluid flow of fluid to be filtered passes continuously through the third stage filter and into the hydraulic reservoir via the clean duct.

17. The hydraulic filter according to claim 15, wherein the fluid flow of the fluid to be filtered is a first fluid flow, further including a second fluid flow of the fluid to be filtered distinct from the first fluid flow, wherein the second fluid flow passes through the first stage filter at least when the bypass valve is in the closed position and is fed to the clean space via the discharge valve.

18. The hydraulic filter according to claim 17, wherein the first fluid flow is continuously supplied to the hydraulic reservoir via the clean duct.

19. The hydraulic filter according to claim 15, wherein the first stage filter has a mesh size of approximately 10 μm, the second stage filter has a mesh size of approximately 50 μm, and the third stage filter has a mesh size of approximately 3 μm.

20. The hydraulic filter according to claim 15, further comprising a throttle arranged on the clean duct.

\* \* \* \* \*